United States Patent [19]

Mukai

[11] Patent Number: 4,876,679
[45] Date of Patent: Oct. 24, 1989

[54] DIGITALLY CONTROLLED POSITIONING SYSTEM FOR QUICKLY MOVING AND THEN FINELY POSITIONING AN OBJECT

[75] Inventor: Toshiharu Mukai, Sennan, Japan

[73] Assignee: Matsushita Electric Industrial Co., Ltd., Osaka, Japan

[21] Appl. No.: 152,428

[22] Filed: Feb. 4, 1988

[30] Foreign Application Priority Data

Feb. 4, 1987 [JP] Japan .................................. 62-24065
Feb. 4, 1987 [JP] Japan .................................. 62-24070

[51] Int. Cl.$^4$ ............................................. G11B 7/00
[52] U.S. Cl. ...................................................... 369/44
[58] Field of Search .................................. 369/43–47; 358/342; 250/201–204

[56] References Cited

U.S. PATENT DOCUMENTS 4,463,300 7/1984 Mayne et al. ........................ 318/687
4,627,039 12/1986 Meyer .................................... 369/44

FOREIGN PATENT DOCUMENTS

57-181436 11/1982 Japan .
61-216183 9/1986 Japan .

Primary Examiner—Robert L. Richardson
Attorney, Agent, or Firm—Wenderoth, Lind & Ponack

[57] ABSTRACT

A positioning system having a velocity feedback loop for positioning an object has two modes—a high speed moving mode and a fine positional resolution moving mode. The system requires a wide range in the high speed moving mode and a high resolution in the fine positional resolution moving mode. To satisfy these inconsistent requirements, the gain of a velocity sensor in the feedback loop is varied according to the mode. The gain is decreased in the high speed moving mode, and increased in the fine positional resolution moving mode. This system may be effectively used to control an optical head of an optical disc player.

5 Claims, 6 Drawing Sheets

DIGITALLY CONTROLLED POSITIONING SYSTEM FOR QUICKLY MOVING AND THEN FINELY POSITIONING AN OBJECT

BACKGROUND OF THE INVENTION

1. Field of the Invention

This invention relates to a positioning system for positioning an object which is to be quickly moved to a desired position and finely positioned at the desired position such as a head of a random access recording device including an optical disc player and a head of printer equipment.

2. Description of the Prior Art

Optical disc players have high density recording capability and high speed random access capability. The track pitch (in the form of either spiral or concentric tracks) of an optical disc is about 1.6 μm or so. In order to allow a light spot to follow such a fine track, the optical disc player needs a high resolution tracking control of is optical head. On the other hand, in order to enable high sped random access, the optical head has to be moved rapidly across the tracks in a radial direction of the disc.

It is very difficult to satisfy these two requirements in a single mechanism, and thus, the conventional optical disc player has two separate mechanisms—a tracking actuator for allowing the light spot to follow a track and a traversing actuator for moving the optical head to traverse the tracks. In order to achieve high speed address seeking, a voice-coil-type linear motor is used as the traversing actuator with a velocity sensor usually installed therein. The velocity of the traversing actuator is sensed by the velocity sensosr, and is fed back to a traversing control system. This constitutes a velocity feedback loop for stabilizing the positioning control of the optical head. An example of such an apparatus is disclosed In Japanese published patent application No. 57-181436, published Nov. 8, 1982, and entitled "Optical Disc Apparatus".

Numerical control has been used in various control systems with the progress of digital signal processing technology and semiconductor technology, but its application has been limited to the fields of control systems for plants, industrial robots and the like. An example of such a system is disclosed in U.S. patent No. 4,463,300, issued Jul. 31, 1984, and entitled "Linear Motor Digital Service Control". These systems operate in a narrow bandwidth of 10 rad/sec or so in general. On the other hand, the control system of an optical disc player usually requires a wide bandwidth of about 10 krad/sec . Digital control systems a sampling device, and its sampling frequency must be set to at least 20 times the width of the bandwidth of the controller. Therefore, the sampling period of the conventional controllers was set experimentally at about 10 msec, but the sampling period of the control system of the optical disc player should be set 0.01 msec or so. It was almost impossible to obtain a calculating speed high enough to operate such a control system by using conventional digital processors (a microprocessor, a digital signal processor and so on). Therefore, an approach to apply digital technology to the optical head control system has been neglected up to the present.

However, a control system using analog circuits cannot avoid a DC offset and thermal drift, which cause positioning errors. Further, the control system composed of analog circuits needs passive parts such as capacitors and resistors for building compensation filters for stabilizing the closed loop system. Even if the control system is mounted to a custom IC (integrated circuit), these passive parts must be mounted outside of the IC as external parts. For this reason, the control system composed of analog circuits was an obstacle for realizing low-cost and small-sized equipment.

SUMMARY OF THE INVENTION

It is an object of the present invention to provide a low-cost digitally controlled positioning system for controlling a position of a movable object with a wide dynamic range in a high speed moving mode and a high resolution in a high positional resolution moving mode.

Another object of the present invention is to provide a digitally controlled positioning system for controlling an optical head of an optical disc player with a wide dynamic range in an address seeking mode and a high resolution in a tracking control mode.

A positioning system according to the present invention for controlling an object which is to be moved quickly in a first, high sped moving, mode and positioned finely at a desired position in a second, high positional resolution moving, mode, comprises:

a position sensor for detecting an actual position of the object;

a seek controller for producing position compensation data from the detected actual position and for producing a seek command signal in the second moving mode; and a velocity feedback loop comprising a velocity sensor for detecting a velocity of the object, a circuit for numerically processing detected object velocity data and the position compensation data to obtain drive data, and a drive unit for driving the object according to the drive data.

The gain of the velocity sensor is decreased in response to the seek command signal so as to operative in a wide velocity range. The numerical processing circuit has a circuit whose gain is increased in response to the seek command signal so as to maintain a total gain of the velocity feedback loop at a constant value.

This system can be effectively used for controlling an optical head of an optical disc player, which also has a velocity feedback loop. A seek controller produces position compensation data representing a position error of a traversing actuator from a desired position. In an address seeking mode, the seek controller produces an address seeking command, which is supplied to a position sensor or a digitizing circuit for digitizing an output signal of the position sensor for decreasing the gain of the position sensor. The velocity feedback loop can operate with a wide dynamic arrange in an address seeking mode and with a high positional resolution in a track following mode.

BRIEF DESCRIPTION OF THE DRAWING

The above and other object, features and advantages of the present invention will become more apparent from the following description taken in connection with the accompanying drawings in which:

FIG. 1 shows a digitally controlled positioning system which has a velocity feedback loop operating in two control modes—a high positional resolution mode for a high resolution positioning of an object and a high speed mode for a high speed movement of the object.

Figure 1:
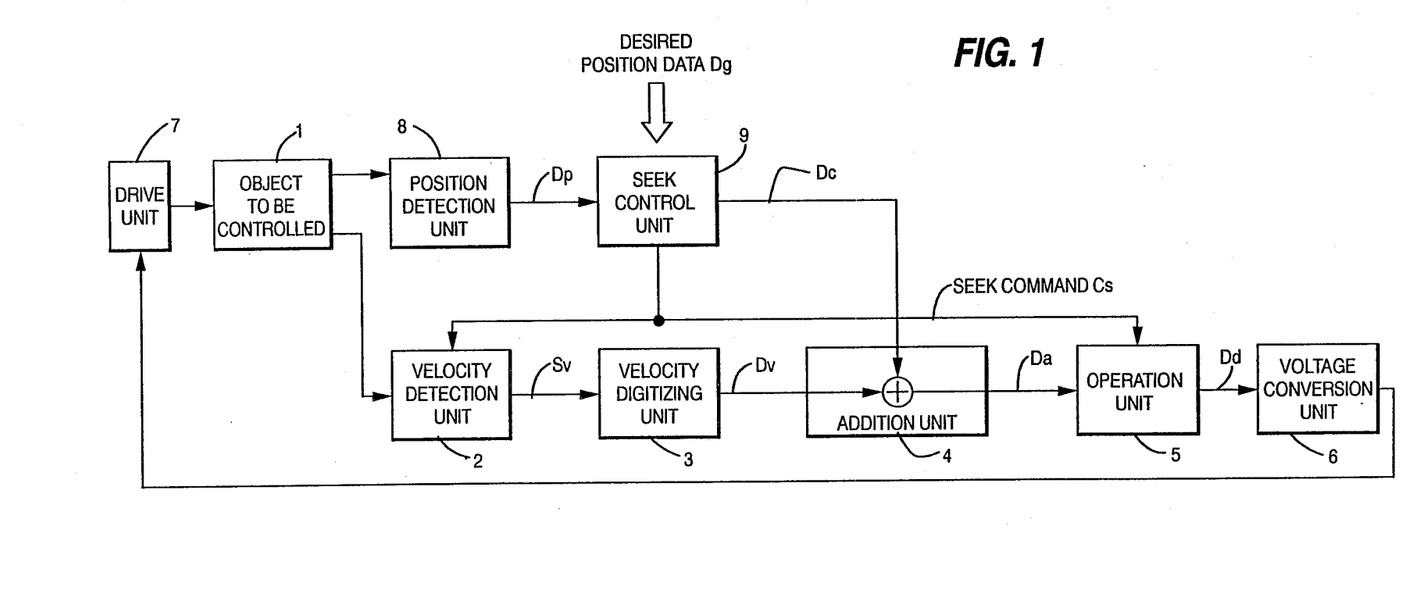
FIG. 1 shows a schematic block diagram of a positioning system in accordance with the present invention.

The velocity feedback loop comprises an object to be controlled 1, a velocity detection unit 2, a velocity digitizing unit 3, and addition unit 4, an operation unit 5, a voltage conversion unit 6 and a drive unit 7.

The velocity detection unit 2 detects the velocity of the object 1 and outputs a velocity detection signal Sv. For example, the velocity detection unit 2 may be a tachometer or a linear encoder installed in the object 1 for generating a signal or whose frequency is proportional to the velocity. The velocity digitizing unit 3 receives the velocity detection signal Sv and converts it into digital velocity data Dv. The addition unit 4 receives the velocity data Dv and adds it to position compensation data Dc (to be described later). An addition result Da is sent to the operation unit 5. The operation unit 5 filters the data Da to obtain drive data Dd. The voltage conversion unit 6 converts the drive data Dd into a voltage signal. For example, the voltage conversion unit 6 may be a digital to analog converted or a binary counter which modulates the drive data Dd into a pulse width of a voltage pulse. The drive unit 7 moves the object 1 according to the voltage signal unit the position compensation data Dc valve is reduced to zero.

The velocity digitizing unit 3 has a limited resolution and a limited dynamic range in general. These two factors are restricted by each other. For example, an 8-bit analog to digital converter is limited in its resolution is 1/255 of the dynamic range. There is no way to improve the resolution except by increasing the word length (from 8 bits to 16 bits, for example).

In the high speed mode, a position detection unit 8 detects a current position of the object 1 and outputs a current position data Dp. A seek control unit 9 receives the current position data Dp and an externally provided desired position data Dg representing the desired position of object 1, and produces, from the desired position data Dg and the current position data Dp, position compensation data Dc which indicates a distance between the current position and the position. If the relative positional error is small, the object 1 does not need to move fast, but if the error is large, the object 1 should move as fast as possible. Therefore, if the value of the position compensation data Dc is larger than a predetermined value, the seek control unit 9 also outputs a seek command Cs, in addition to the position compensation data Dc, to the velocity feedback loop. This state is the high speed mode.

The position compensation data Dc is sent to the addition unit 4. The seek command Cs is sent to the velocity detection unit 2 and the operation 5. In the high speed mode, the velocity detection unit 2 need to have a wide dynamic range because the velocity of the object 1 is large. To obtain the wide dynamic range, the velocity detection unit 2 decreases its gain in response to the seek command Cs. At the same time, the operation unit 5 increases its gain in response to the seek command Cs because the total loop gain of the velocity feedback loop should be fixed for stability.

On the other hand, when the current position data Dc becomes close to the desired position data Dg, or the position compensation data Dc becomes within the predetermined value, the seek control unit 9 resets the seek command Cs. This state is the high resolution mode.

In the high resolution mode, the velocity detection unit 2 does not need a wide dynamic range but needs a high resolution because the velocity of the object 1 is small enough but should be detected at a high positional resolution. Therefore, the velocity detection unit 2 increases its gain and the operation unit 5 decreases its gain in response to the resetting of the seek command Cs to obtain the high resolution with the total loop gain of the velocity feedback loop being kept fixed for stability.

Figure 2:
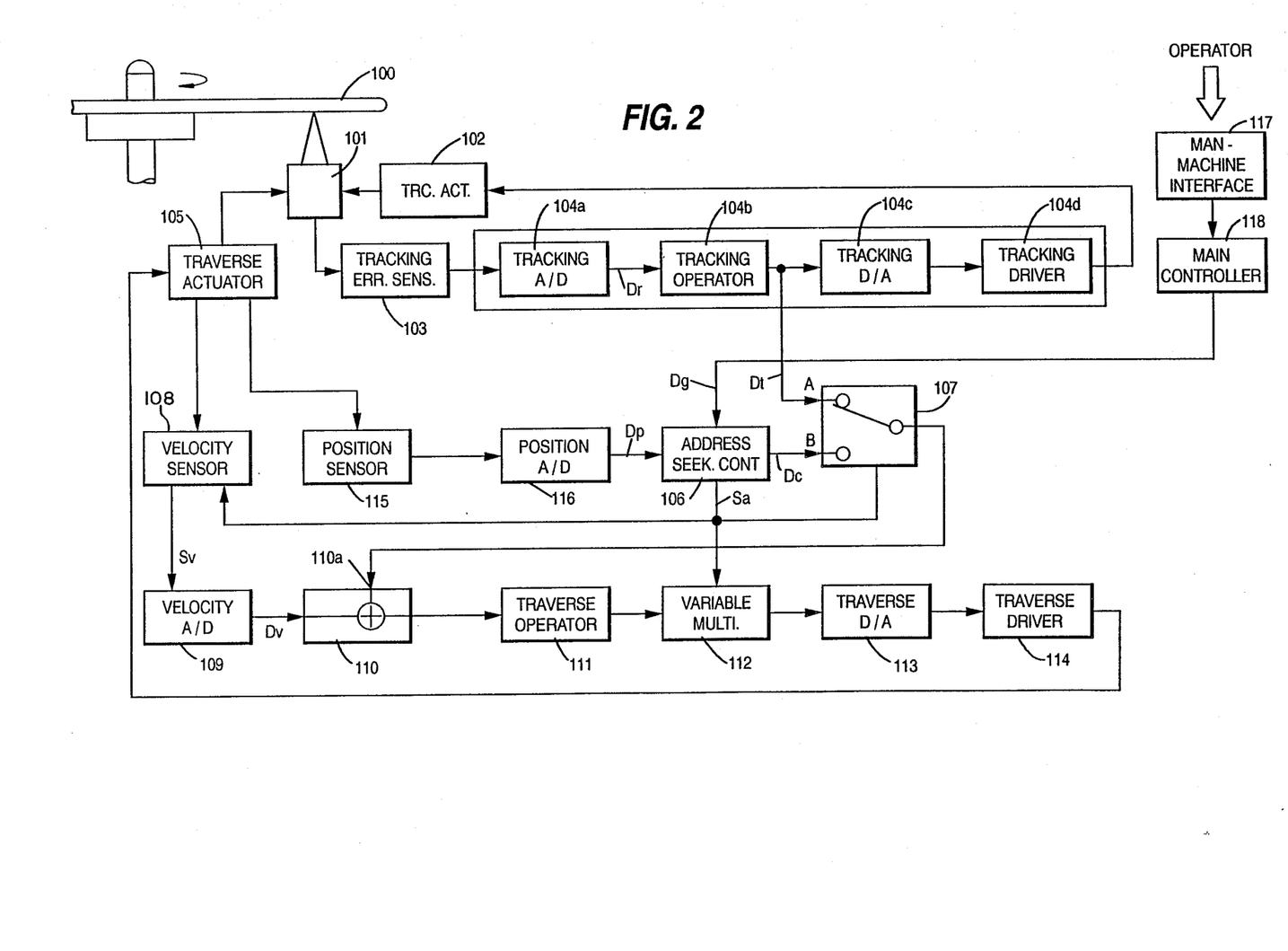
FIG. 2 shows a schematic block diagram of a positioning system for an optical disc player in accordance with another embodiment of the present invention.
Figure 3:
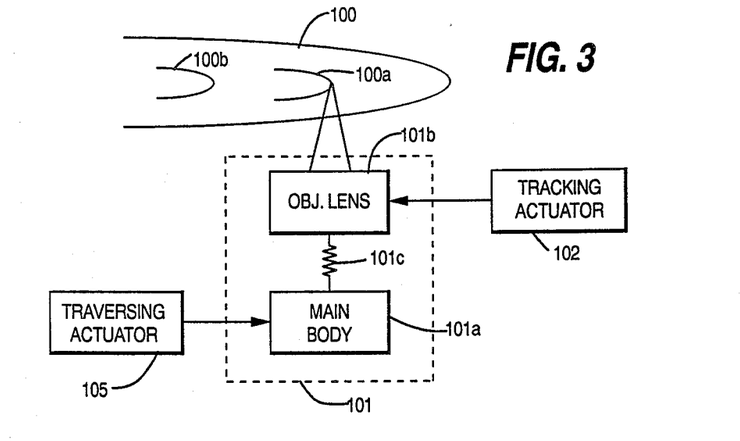
FIG. 3 illustrates a relationship between a tracking actuator and a traversing actuator in an optical head.

FIG. 2 shows a schematic block diagram of a positioning system for an optical disc player embodying the present invention. The positioning system has two closed loops—a tracking control loop for track following and a traversing control loop for a traversing actuator. The tracking control loop comprises an optical head 101, a tracking error sensor 103, a tracking controller 104 and a tracking actuator 102. The relationship between the tracking actuator 102 and a traversing actuator 105 is illustrated in FIG. 3. The tracking actuator 102 drives an objective lens unit 101b movably mounted on a main body 101a of the optical head 101 via a damping element 101c to finely follow a track 100a formed on an optical disc 100. The traversing actuator 105 drives the main body 101a of the optical head 101 to roughly follow the track if the track is spiral or to move a large distance from one track to another, for example from the track 100a to another track 100b by traversing tracks located therebetween.

Information is recorded in concentric or spiral tracks formed on the optical disc 100. The optical head 101 focuses a light beam on a track to form a light spot. A focusing control system, which is not related to the present invention, is not illustrated.

Referring back to FIG. 2, the tracking error sensor 103 produces a relative position signal indicative of a position of the light spot relative to a track from an intensity or phase error of a reflected light from the disc 100. The relative position signal is sent to the tracking controller 104.

The tracking controller 104 comprises a tracking analog to digital (A/D) converter 104a, a tracking operator 104b, a tracking digital to analog (D/A) converter 104c, and a tracking driver 104d. The tracking A/D converter 104a converts the relative position signal to digital relative position data Dr. The relative position data Dr is sent to the tracking operator 104b. The tracking operator 104b is a PID (proportional plus integral plus derivative) controller for stabilizing the tracking control loop. It filters the relative position data to obtain tracking drive data Dt. The tracking drive data Dt is converted to a tracking voltage signal by the tracking D/A converter 104c. The tracking voltage signal is amplified by the tracking driver 104d, and is supplied to the tracking actuator 102 so that the tracking actuator 102 actuates the optical head 101 to follow a desired track.

The traversing control loop comprises the traversing actuator 105, a position sensor 115, a position analog to digital (A/D) converter 116, an address seeking controller 106, a selector 107, a velocity sensor 108, a velocity analog to digital (A/D) converter 109, an adder 110, a traverse operator 111, a variable multiplier 112, a traverse digital to analog (D/A) converter 113, and a traverse driver 114.

The traversing actuator 105 moves the optical head 101 across tracks on the optical disc 100. The position sensor 115 produces a current position signal indicative of an absolute position of the traversing actuator 105, for example, by counting pulses from a ladder-like linear scale (not illustrated) installed in the actuator 105. The position A/D converter 116 converts the current position signal from the position sensor 115 to digital current position data Dp and sends the data Dp to the address seeking controller 106.

The address seeking controller 106 compares the current position data Dp with desired position data Dg received from a main controller 118 of the optical disc player. The main controller 118 produces the data Dg from an instruction inputted by an operator via a man-machine interface 117 or a program previously prepared therein. When data Dp and Dg are not equal to each other, the address seeking controller 106 outputs an address seeking command Sa and a position compensation data Dc corresponding to a difference between the desired position data Dg and the current position data Dp.

The selector 107 passes there through either the position compensation data Dc when the address seeking command Sa is outputted from the address seeking controller 106 or the tracking drive data Dt when the address seeking command Sa is not outputted. Output data from the selector 107 is fed to an input terminal 110a of the adder 110.

The velocity sensor 108 detects a velocity of the traversing actuator 105, for example, by measuring the width of each of the pulse from the ladder-like linear scale, and outputs as a detection result a velocity signal Sv. The velocity A/D converter 109 converts the velocity signal Sv to digital velocity data Dv. The adder 110 numerically adds the velocity data Dv to the output data (Dt or Dc) from the selector 107, and sends an addition result to the traverse operator 111. The traverse operator 111 is a known digital filter which executes a z-transformation or performs Tustin'bilinear method to filter the output data of the adder 110. The filtered output data of the traverse operator 111 is multiplied by a predetermined coefficient in the variable multiplier 112. The traverse D/A converter 113 converts output data of the variable multiplier 112 to a voltage signal, which is amplified by the traverse driver 114, and supplied to the traverse actuator 114 for moving the optical head 101.

The second closed loop containing the velocity sensor 108 and the velocity A/D converter 109 constitutes a velocity feedback loop whose control input is the terminal 110a of the adder 110 as illustrated in FIG. 1. This loop is the main block of the positioning system. The velocity of the traversing actuator 105 is proportional to the value of the data fed to the terminal 110a.

The optical disc player has two operating modes—an address seeking mode, and a track following mode. The address seeking mode is for moving the optical head 101 to a desired track which has a desired address. The track following mode is for allowing the optical head 101 to follow the track after the address seeking mode. In the track following mode, the main aim of the positioning system is to control the tracking actuator 102 so as to keep the position of the optical head 101 within an allowable deviation range from the center of a track.

A status transition between the two modes is described below.

Figure 4:
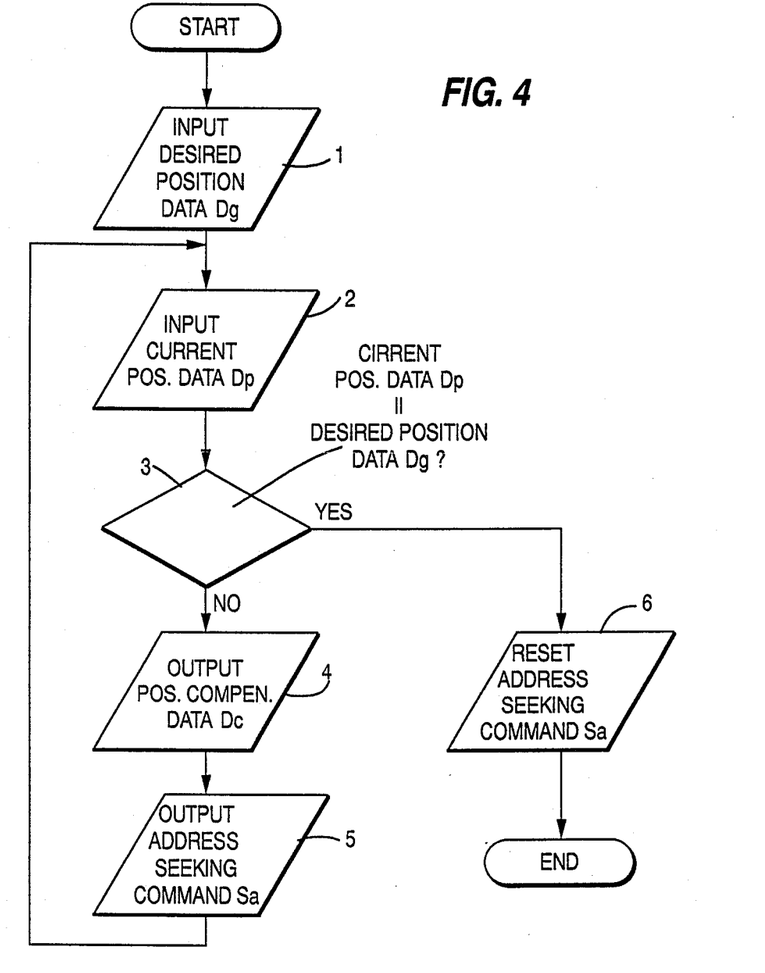
FIG. 4 shows a schematic flow chart of an address seeking mode.

FIG. 4 is a flow chart showing the operation of the address seeking controller 106 in the address seeking mode.

First, the desired position data Dg is sent from the main controller 118 to the address seeking controller 106 in step ①. After receiving the desired position data Dg, the address seeking controller 106 receives current position data Dp from the position A/D converter 116 in step ②, and compares the current position data Dp with the data Dg in step ③. If the current position data Dp does not coincide with the desired position data Dg, the address seeking controller 106 outputs position compensation data Dc to the selector 107 in step ④, and concurrently outputs an address seeking command Sa to the selector 107, the velocity sensor 108 and the variable multiplier 112 in step ⑤.

After ending step ⑤, or in other words, after the address seeking command Sa has been outputted, the status of the player is changed to the address seeking mode. In this address seeking mode, the selector 107 selects its input terminal B connected to the address seeking controller 106 so as to pass the position compensation data Dc, which is fed to the velocity feedback loop from the input terminal 110a of the adder 110. The traversing actuator 105 begins to move in response to the position compensation data Dc.

Here, the traversing actuator 105 should arrive at a track indicated by the desired position data Dg as rapidly as possible in order to achieve high speed address seeking. Therefore, the velocity sensor 108 is required to detect a velocity in a wide velocity range. For this reason, the gain of the velocity sensor 108 is decreased in response to the address seeking command to detect a velocity in the wide velocity range. For example, the range is at least 33 mm/sec, when the traversing actuator 105 is to move from the innermost track to the outermost track in 1 sec. In this case, the detectable working range of the traverse A/D converter 109 is set to be at least 33 mm/sec. The traverse A/D converter 109 can convert the velocity of the traversing actuator 105 to the velocity data Dv. The gain of the variable multiplier 112 is increased to keep the total gain of the feedback loop constant.

The address seeking controller 106 repeats the process of steps ② through ⑤ until the current position data becomes the desired position data in step ③. When the current position data Dp coincides with the desired position data Dg, the address seeking controller 106 resets the address seeking command Sa in step ⑥.

After ending step ⑥, the player is changed to the track following mode, in which the selector 107 selects its input terminal A connected to the tracking operator 104b. The velocity feedback loop is provided with the tracking operating data Dt from the input terminal 110a of the adder 110, and the traversing actuator 105 begins to obey the tracking operating data.

On the other hand, the gain of the velocity sensor 108 is increased, and the coefficient of the variable multiplier 112 is decreased. In the track following mode, the velocity A/D converter 109 needs a high resolution rather than a wide working range because the average velocity in this mode is 0.015 mm/sec., which is far smaller than 33 mm the/sec. in the address seeking mode. By increasing the gain of the velocity sensor 108, a smaller rounding error and improved resolution can be obtained in the velocity A/D converter 109. On the other hand, the open loop gain of the velocity feedback loop is not changed, because the coefficient value of the variable multiplier 112 is decreased to balance the open loop gain of the velocity feedback loop in the address seeking mode with that in the track following mode.

As described above, the limited word length of the velocity A/D converter 109 can be utilized effectively because the gains of the velocity sensor 108 and the variable multiplier 112 can be set according to the two operating modes of the player.

Figure 5:
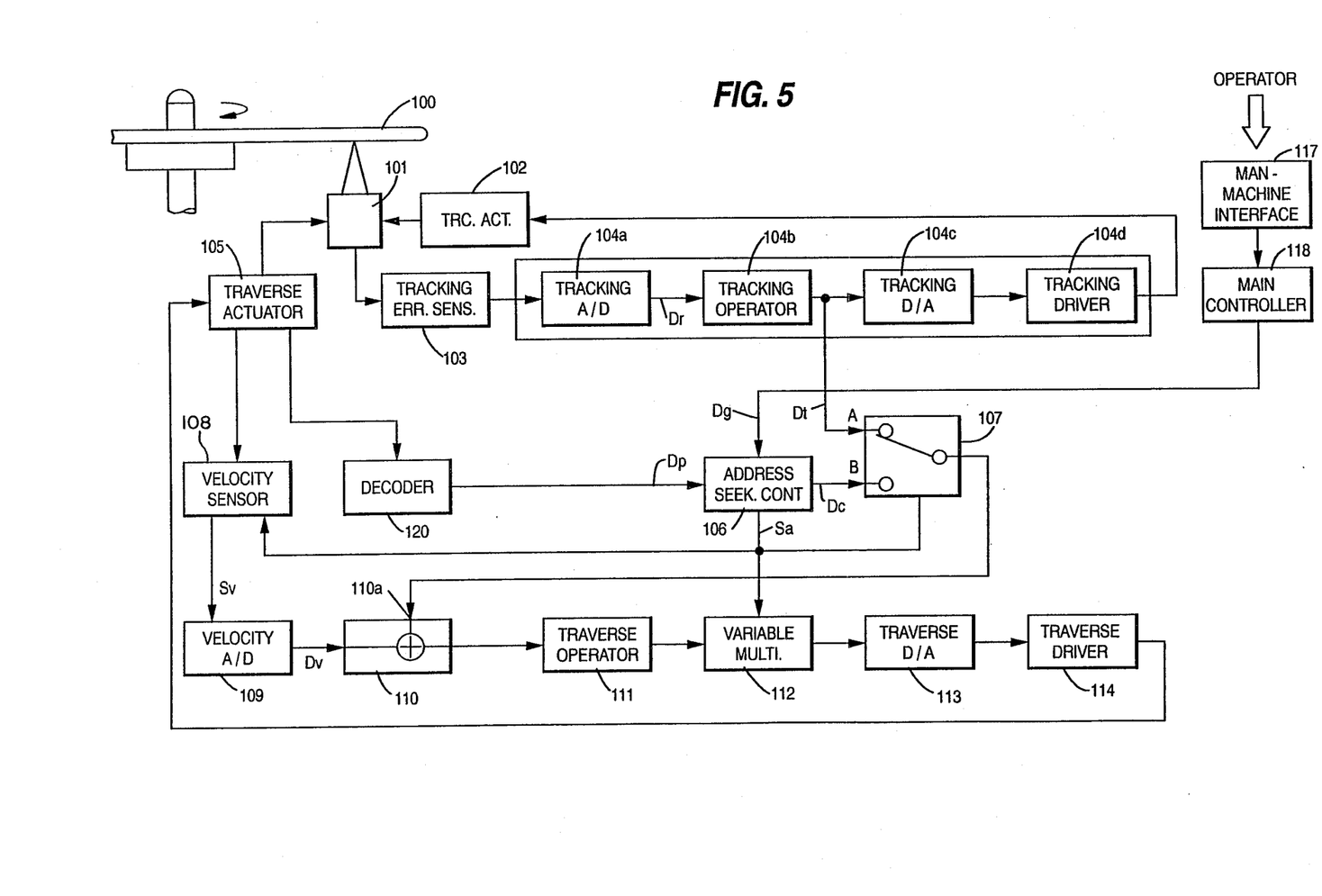
FIG. 5 shows a schematic block diagram of a positioning system for an optical disc player in accordance with still another embodiment of the present invention.

The position sensor 115 and the position A/D converter 116 may be replaced by a decoder. FIG. 5 shows a schematic block diagram of a positioning system which is provided with decoder 120 in place of the position sensor 115 and the position A/D converter 116 in FIG. 2.

Generally, each data block recorded in the optical disc 100 includes an address data for identifying the position of the optical head 101. The decoder 120 extracts a current address data from the signal reproduced by the optical head 101, and converts the current address data into absolute position data which is sent to the address seeking controller 106. The absolute position data is equivalent to the current position data Dp in FIG. 2. Therefore the operation and effect of the system shown in FIG. 5 is equivalent to that of the system shown in FIG. 2.

Figure 6:
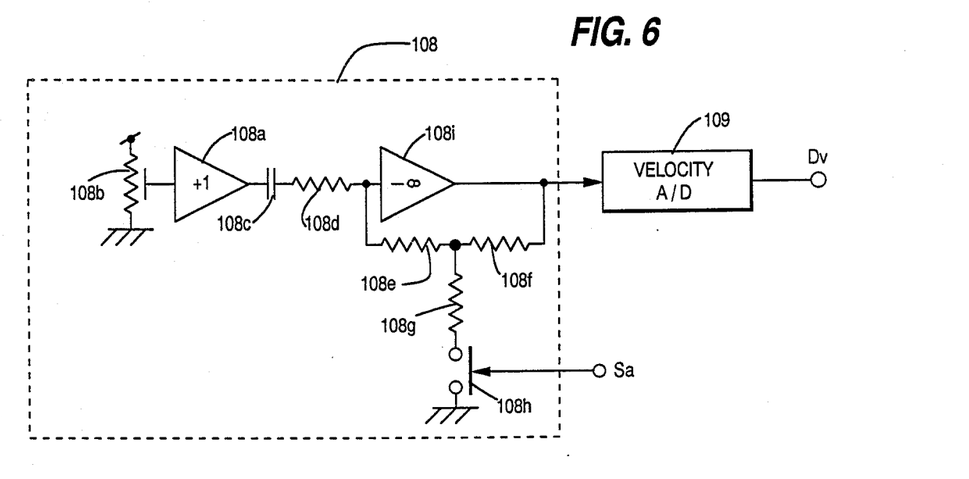
FIG. 6 shows a circuit diagram of an exemplary arrangement of a velocity sensor and a velocity digitizing circuit.

FIG. 6 shows a circuit diagram of an exemplary configuration of the velocity sensor 108. In FIG. 6, the velocity sensor 108 comprises operational amplifiers 108a and 108i, a variable resistor 108b, a capacitor 108c, fixed resistors 108d, 108e, 108f, and 108g, and an analog switch 108h. The variable resistor 108b is contained within the traversing actuator 105, and varies in resistance according to the position of the traversing actuator 105. An output voltage of the operational amplifier 108i is proportional to the resistance of the variable resistor 108b. The capacitor 108c and the fixed resistor 108d constitute a high-pass filter. The transfer function of this filter F(s) is as follows:

$$F(s) = -s(Z/R1)/(1+sCR1) \quad (1)$$

where C denotes a capacitance of the capacitor 108c, R1 denotes a resistance of the fixed resistor 108d, s denotes a Laplace operator, and Z denotes a synthetic resistance determined by the fixed resistors 108e, 108f and 108g.

Figure 7:
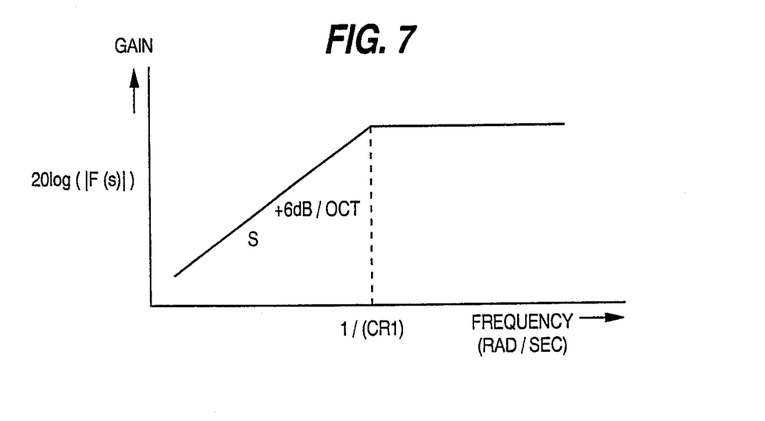
FIG. 7 shows a frequency response of a highpass filter in FIG. 6.

FIG. 7 shows a frequency response of the high-pass filter. The value CR1 limits the frequency range of derivative action in the filter as shown in FIG. 7. Therefore, when the value CR1 is set large enough relative to the frequency range of the input signal (the output voltage of the operational amplifier 108a), the eq. (1) can be rewritten equivalently as follows:

$$F(s) \approx -s(Z/R1) \quad (1)'$$

Since the output voltage of the operational amplifier 108a is proportional to the position of the traversing actuater 105, the output voltage of the operational amplifier 108b is also proportional to the velocity of the traversing actuator 105.

The analog switch 108h is closed in the track following mode, and opened in response to the address seeking command Sa in the address seeking mode. Therefore, the value of Z is a follows:

$$Z = 2R + R^2/R_0 \text{ (in the track following mode)}$$

$$= 2R \text{ (in the address seeking mode)}$$

where R denotes a resistance of each of the fixed resistors 108e and 108f, and $R_0$ denotes a resistance of the fixed resistor 108g.

As shown above, the gain of the velocity sensor 108 increases in the track following mode and decreases in the address seeking mode according to the closing and opening of the analog switch 108h.

Figure 8:
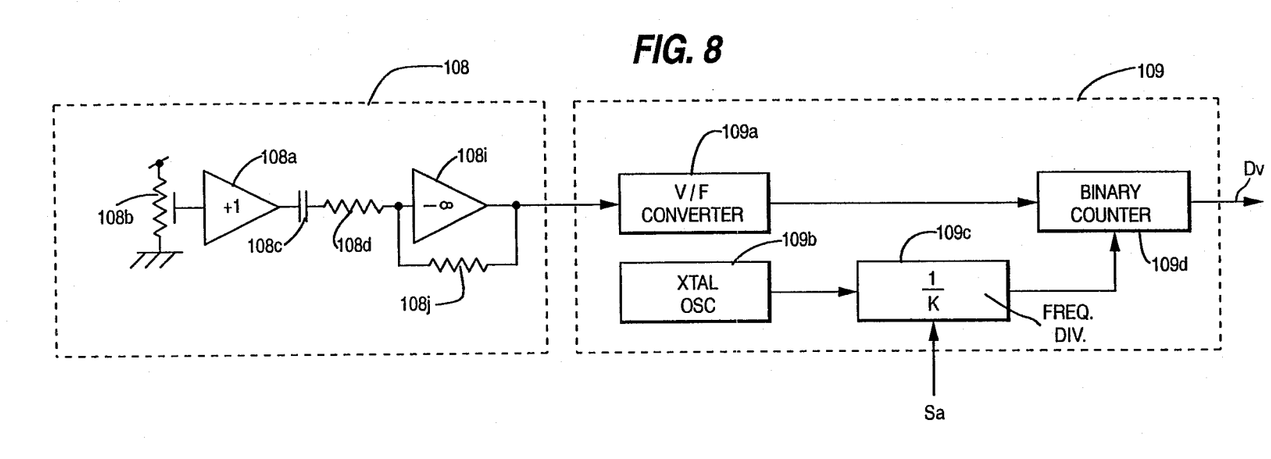
FIG. 8 shows a block diagram of another exemplary arrangement of a velocity sensor and a velocity digitizing circuit.

FIG. 8 is a block diagram showing another configuration of the velocity sensor 108 and the velocity A/D converter 109. In FIG. 8, the velocity sensor 108 comprises operational amplifiers 108a, and 108i, a variable resistor 108b, and fixed resistors 108d and 108j. The velocity A/D converter 109 comprises a V/F converter (voltage to frequency converter) 109a, a crystal oscillator 109b, a frequency divider 109c, and a binary counter 109d. The variable resistor 108b, and the operational amplifiers 108a and 108i are the same as those shown in FIG. 6. The capacitor 108c and the fixed resistor 108d constitute a high-pass filter. The transfer function of this filter F'(s) is as follows:

$$F'(s) = -s(R2/R1)/(1+sCR1) \quad (2)$$

where C denotes a capacitance of the capacitor 108c, R1 denotes a resistance of the fixed resistor 108d and R2 denotes a resistance of the fixed resistor 108j. In eq. (2), Z in eq. (1) is replaced by R2. The process to detect the velocity of the traversing actuator 105 is the same as that illustrated in FIG. 7.

The V/F converter 109a converts the output voltage of the operational amplifier 108i which is proportional to the distance moved by the traversing actuator 105 into a frequency signal. The pulse width of the frequency signal is proportional to the velocity of the traversing actuator 105. The binary counter 109d counts the number of pulses from the frequency divider 109c during a duration of one pulse of the frequency signal to digitally detect the velocity. The detected velocity is proportional to the frequency of the frequency divider 109c, and the frequency is proportional to a division ratio K of the frequency divider 109c. Therefore, the detected velocity is proportional to the division ratio K. The division ratio K of the frequency divider 109c is increased in response to the address seeking command Sa. Therefore, instead of directly changing the gain of the velocity sensor 108, the same effect can be obtained by changing the conversion ratio of the velocity A/D converter 109.

Figure 9:
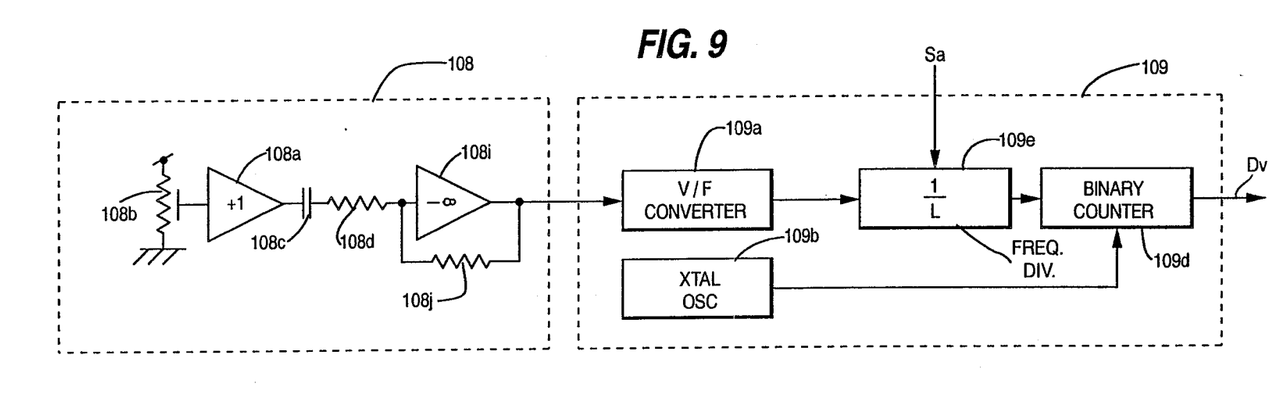
FIG. 9 shows a block diagram of still another exemplary arrangement of a velocity sensor and a velocity digitizing circuit. DESCRIPTION OF THE PREFERRED EMBODIMENTS

Moreover, FIG. 9 shows a block diagram of still another configuration of the velocity sensor 108 and velocity A/D converter 109. In FIG. 9, the velocity sensor 108 is the same as that shown in FIG. 8. The velocity A/D converter 109 comprises a V/F converter 109a, a crystal oscillator 109b, a frequency divider 109e, and a binary counter 109d. The V/F converter 109a converts the output voltage of the operational amplifier 108i which is proportional to the velocity of the traversing actuator 105. The output frequency of the V/F converter 109a is divided by L in the frequency divider 109e.

The binary counter 109d counts the number of pulses from the crystal oscilator 109b during a duration of one pulse of the frequency signal from the frequency divider 109e to digitally the velocity. The detected velocity is proportional to the devision ratio L, and the gain of the velocity sensor 108 can be equivalently decreased according to variation of the division ratio L in response to the address seeking command Sa.

Although several embodiments of the invention have been shown and described, it should be understood that various changes and modifications may be made without departing from the scope of the invention.

What is claimed is:

1. A positioning system for controlling an object which is to be moved quickly in a first, high speed moving, mode and which is to be positioned finely at a desired position in a second, high positional resolution moving, mode, said system comprising:
   a position detecting means for detecting an actual position of said object, and for producing absolute position data indicative of said actual position;
   a seek control means for comparing said actual position data with predetermined desired position data and for producing position compensation data representing a difference between said actual position data and said desired position data, said seek control means also outputting a seek command signal when said position compensation data is larger than a predetermined value;
   a velocity sense means for detecting a moving velocity of the object to be moved and for providing an output corresponds thereto, said sense means decreasing its gain in response to said seek command signal from said seek control means;
   a velocity digitizing means for digitizing said output of said velocity sense means so as to output digital velocity data;
   an addition means for adding said velocity data from said velocity digitizing to said position compensation data from said seek control means and for providing an output corresponding thereto;
   an operation means for processing said output of said addition means to be obtain position control data, and for multiplying said position control data by a predetermined coefficient to produce output data corresponding thereto, said predetermined coefficient being increased in response to said seek command signal from said seek control means;
   a voltage conversion means for converting said output data from said operation means into a voltage signal; and
   a drive means for moving said object to be controlled according to said voltage signal.

2. In an optical disc player which reproduces information recorded in tracks on a recording disc by using an optical head which focuses a light beam to form a light spot on a track on the recording disc and which detects a reflected beam from the recording disc, a positioning system for positioning the optical head comprising:
   a tracking error detection means for detecting a tracking error from the reflected beam;
   a tracking control means for controlling the optical head such that the light spot follows the track according to said tracking error and for generating tracking operation data;
   a carriage means for traversing the optical head across said tracks;
   a position detecting means for detecting an actual position of said carriage means, and for producing actual position data indicative of said actual position;
   a seek control means for comparing said actual position data with predetermined desired position data representing a desired track and for calculating position compensation data representing a difference between said actual position data and said desired position data, said seek control means also outputting an address seeking command signal when said position compensation data is larger than a predetermined value;
   a selection means for normally selecting said tracking operation data from said tracking control means, and is responsive to said address seeking command signal from said seek control means for otherwise selecting said position compensation data from said seek control means;
   a velocity sense means for detecting a moving velocity of said carriage means and for providing an output corresponding thereto, said sense means decreasing its gain in response to said address seeking command signal from said seek control means;
   a velocity digitizing means for digitizing and output of said velocity sense means so as to output digital velocity data;
   an addition means for adding said velocity data to data selected by said selection means and for providing an output corresponding thereto;
   an operation means for processing said output data from said addition means to obtain position control data;
   a variable coefficient means for multiplying said position control data by a predetermined coefficient and for providing an output corresponding thereto, said predetermined coefficient being increased in response to said address seeking command signal from said seek control means;
   a voltage conversion means for converting said output data from said variable coefficient means into a voltage signal; and
   a drive means for moving said carriage means according to said voltage signal.

3. In an optical disc player which reproduces information recorded in tracks on a recording disc by using an optical head which focuses a light beam to form a light spot on a track and detects a reflected light beam from the recording disc, and which operates in one of an address seeking mode for moving the optical head from one track to another and a track following mode for allowing the light spot to trace a track, a positioning system fro positioning the optical head, comprising:
   a carriage means for traversing the optical head across the tracks;
   a velocity feedback control means for controlling a velocity of said carriage means, said velocity feedback control means having a velocity detecting means for normally detecting a velocity of said carriage means finely in a predetermined velocity range; and a control means for producing an address seeking command signal only in said address seeking mode; wherein said velocity detecting means is responsive to said address seeking command signal for decreasing its gain so as to detect a velocity of said carriage means coarsely in a wider velocity range than said predetermined velocity range when in said address seeking mode.

4. A positioning system according to claim 3, wherein said velocity feedback control means has a means which is responsive to said address seeking command signal for keeping a total gain of said velocity feedback control means constant.

5. A positioning system according to claim 3, wherein said control means comprises a position detecting means for detecting an actual position of said carriage means and for providing an output corresponding thereto, and a seek control means for comparing actual position said output by said position detecting means with a predetermined desired position for outputting said address seeking command signal when a difference between said position and said desired position is greater than a predetermined distance.

* * * * *